US011425133B2

(12) United States Patent
Dave

(10) Patent No.: US 11,425,133 B2
(45) Date of Patent: Aug. 23, 2022

(54) SYSTEM AND METHOD FOR NETWORK DEVICE SECURITY AND TRUST SCORE DETERMINATIONS

(71) Applicant: Harman International Industries, Incorporated, Stamford, CT (US)

(72) Inventor: Neisarg Dave, Jaipur (IN)

(73) Assignee: Harman International Industries, Incorporated, Stamford, CT (US)

( * ) Notice: Subject to any disclaimer, the term of this patent is extended or adjusted under 35 U.S.C. 154(b) by 216 days.

(21) Appl. No.: 16/500,080

(22) PCT Filed: Apr. 3, 2017

(86) PCT No.: PCT/IB2017/051897
§ 371 (c)(1),
(2) Date: Oct. 1, 2019

(87) PCT Pub. No.: WO2018/185521
PCT Pub. Date: Oct. 11, 2018

(65) Prior Publication Data
US 2020/0067944 A1 Feb. 27, 2020

(51) Int. Cl.
*H04L 9/40* (2022.01)
*H04W 12/60* (2021.01)
(Continued)

(52) U.S. Cl.
CPC ........ *H04L 63/102* (2013.01); *H04L 63/0823* (2013.01); *H04L 63/126* (2013.01);
(Continued)

(58) Field of Classification Search
CPC . H04L 63/102; H04L 63/0823; H04L 63/126; H04L 9/006; H04L 9/3263;
(Continued)

(56) References Cited

U.S. PATENT DOCUMENTS 10,057,264 B1* 8/2018 ElNakib ................ H04L 63/102
10,405,039 B2* 9/2019 Vinson ................... H04H 60/33
(Continued)

FOREIGN PATENT DOCUMENTS

CN  101257386 A  9/2008
CN  102065127 A  5/2011

OTHER PUBLICATIONS

Max Smith-Creaset et al., "Adaptive Threshold Scheme for Touchscreen Gesture Continuous Authentication using Sensor Trust," 2017, pp. 554-561. (Year: 2017).*

(Continued)

*Primary Examiner* — Luu T Pham
*Assistant Examiner* — Canh Le
(74) *Attorney, Agent, or Firm* — McCoy Russell LLP

(57) ABSTRACT

The present disclosure relates to systems, devices and methods for device security and trust score determinations. In one embodiment, a method includes requesting, by a first device, trust score data for a second device, wherein the first device requests trust score data from a trust score management server, and receiving, by the first device, trust score data from the trust score management server. The method also includes generating a first trust score for the second device and transmitting the first trust score for the second device with a trust score management server. The method also includes configuring, by the first device, at least one control parameter for operation of the first device with the second device based on the first trust score, wherein configuring adjusts a previous control parameter to restrict operation of the first device relative to the second device. Device and systems are provided to enhance network security.

21 Claims, 6 Drawing Sheets

(51) Int. Cl.
*H04W 12/106* (2021.01)
*H04W 12/122* (2021.01)

(52) U.S. Cl.
CPC ....... *H04W 12/106* (2021.01); *H04W 12/122* (2021.01); *H04W 12/66* (2021.01)

(58) Field of Classification Search
CPC . H04W 12/66; H04W 12/106; H04W 12/122; H04W 4/70; H04W 12/069; G06F 21/33
See application file for complete search history.

(56) References Cited

U.S. PATENT DOCUMENTS

| | | | |
|---|---|---|---|
| 10,735,414 B1* | 8/2020 | Ketharaju | H04L 63/0861 |
| 2011/0078775 A1* | 3/2011 | Yan | H04L 63/1433 |
| | | | 726/6 |
| 2013/0091352 A1* | 4/2013 | Patel | H04L 63/0823 |
| | | | 713/156 |
| 2014/0250496 A1* | 9/2014 | Amidon | H04L 63/107 |
| | | | 726/3 |
| 2016/0277424 A1 | 9/2016 | Mawji et al. | |
| 2017/0279773 A1* | 9/2017 | Koripella | H04L 63/1408 |

OTHER PUBLICATIONS

Ikram Ud Din et al., "Trust Management Techniques for the Internet of Things: A Survey," Nov. 12, 2018. pp. 29763-29787 (Year: 2018).*

* cited by examiner

SYSTEM AND METHOD FOR NETWORK DEVICE SECURITY AND TRUST SCORE DETERMINATIONS

CROSS-REFERENCE TO RELATED APPLICATION

This application claims priority to and is the National Stage filing of International Application No. PCT/IB2017/051897, titled SYSTEM AND METHOD FOR NETWORK DEVICE SECURITY AND TRUST SCORE DETERMINATION filed on Apr. 3, 2017, the content of which is expressly incorporated by reference in its entirety.

FIELD

The present disclosure relates to systems, methods and devices for network communication, and more particularly to enhancing security and determining trust scores.

BACKGROUND

Implementing network capabilities to electronic devices has been very popular as of late. Recent developments in wireless technology have allowed for new applications and opportunities in this space. Devices that customarily have been used without network communications that now include network control or communications. For example, a "smart light bulb" refers to a light bulb which may be controlled using a network connection. Some reports indicate that 26 billion devices will include network capabilities by the year 2020. It is also estimated that 250,000 of the connected devices will be vehicles.

Security is a major concern with many devices exchanging information and collaborating at a large scale. Conventional network devices may be susceptible to a number of weak links in the overall network. Hackers or malicious parties may be able to exploit networks, and devices to carry out malicious tasks. The scale of the upsets caused due to malicious activities would only expand and losses would be even greater. Recently, there have been instances where malicious sites were able to get a certificate issued by a reputed and trusted certificate authority. With large numbers of devices, there is a very large possibility that gateways for malicious activities exist and can affect billions of devices. There exists a need for improved security for network devices.

BRIEF SUMMARY OF THE EMBODIMENTS

Disclosed and claimed herein are methods, devices and systems for configured to provide trust score determination for device security. One embodiment is directed to a method including requesting, by a first device, trust score data for a second device, wherein the first device requests trust score data from a trust score management server. The method also includes receiving, by the first device, trust score data from the trust-score management server. The method also includes generating, by the first device, a first trust score for the second device, and transmitting, by the first device, the first trust score for the second device with a trust score management server. The method also includes configuring, by the first device, at least one control parameter for operation of the first device with the second device based on the first trust score, wherein configuring adjusts a previous control parameter to restrict operation of the first device relative to the second device.

In one embodiment, requesting is in response to the first device identifying the second device on a network.

In one embodiment, the first device and the second device are each configured to provide at least one function and a data storage capability.

In one embodiment, trust score data is received from the trust score management server providing trust scores for the second device from one or more devices on a network and trust score data generated by one or more certificate authorities.

In one embodiment, generating the first trust score includes the first device generating a trust score based on a certificate of the second device, and a trust score from a third device.

In one embodiment, transmitting the first trust score by the first device includes sharing the trust score value and identification of the second device with the server.

In one embodiment, configuring includes determining that the first trust score is below a threshold of the first device for sharing data with other devices.

In one embodiment, method further includes setting, by the first device, a data sharing restriction for the second device based on the trust score.

In one embodiment, one of an average of trust score calculations and weighted average of trust scores are performed to determine the first trust score for the second device.

In one embodiment, the first device maintains a rule based trust score determination for calculation of trust scores.

In one embodiment, the first device limits interaction with the second device for partial data sharing with the second device based on the trust score calculation.

Another embodiment is directed to a device configured with security and trust score determination on a network, the device including a communication module configured for network data communication, a functional module, and a controller coupled to the communication module and functional module. The, the controller module is configured to request trust score data for a second device, wherein the first device requests trust score data from a trust score management server, and receive trust score data from the trust score management server. The controller module is also configured to generate a first trust score for the second device and transmit the first trust score for the second device with a trust score management server. The controller module is also configured to configure at least one control parameter for operation of the first device with the second device based on the first trust score, wherein configuring adjusts a previous control parameter to restrict operation of the first device relative to the second device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
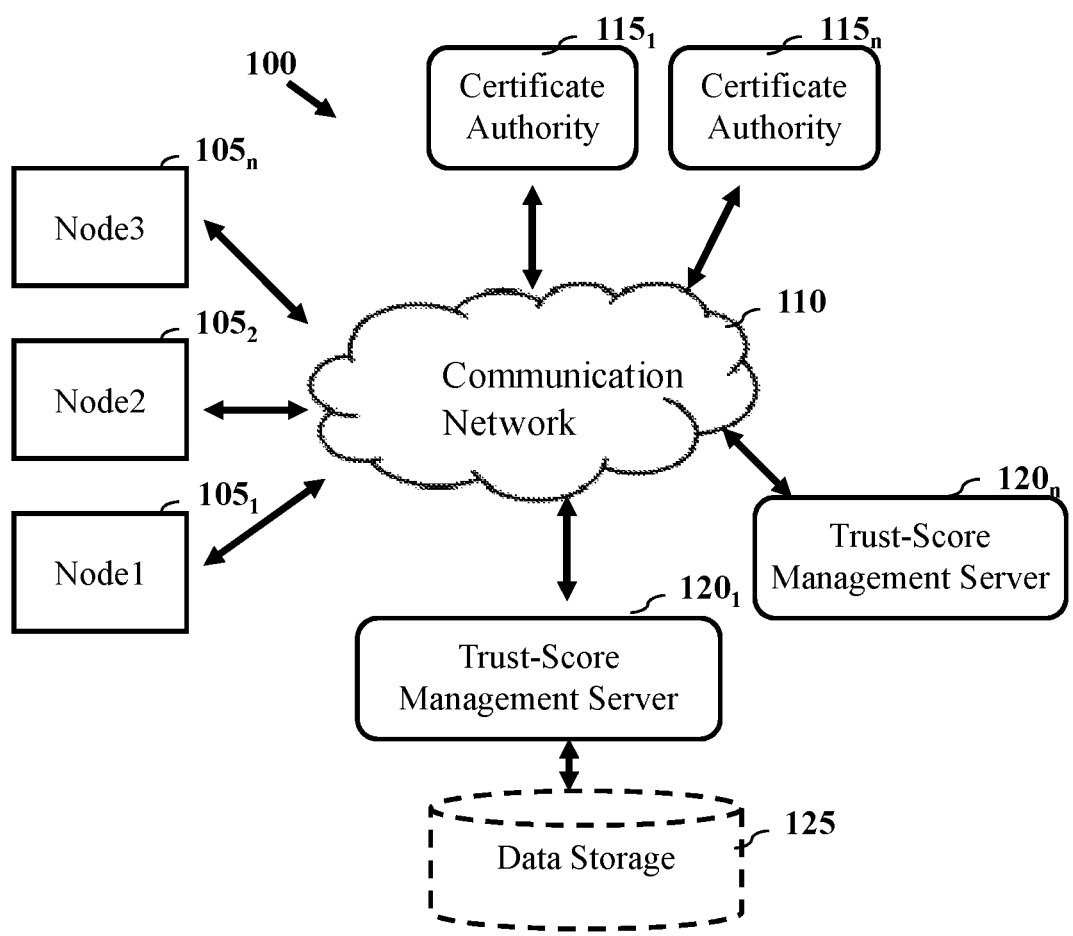
FIG. 1 depicts a graphical representation of a system according to one or more embodiments.

One aspect of the disclosure is directed to security for networked devices, and in particular processes and configurations of devices to determine communication, data exchange/sharing and control. In one embodiment, processes are provided to determine trust scores for other devices to allow for device interoperation and/or limiting device interaction. Processes described herein may be performed by individual devices, or nodes, of a network. References to a network refer to a computer network and include devices connected via wired and wireless connections. A network described herein may relate to an internet protocol based network (IP network). In other embodiments, network collection of devices configured to communicate using an IP protocol, such as an IoT network. The processes provided herein describe an ordered series of functions performed by devices to network security and improve network identification of device trust. Processes described herein may include determining trust scores for devices, sharing trust scores and allowing for device specific determinations.

Another embodiment is directed to a vehicle system configured to employ trust score determinations. In one embodiment, a vehicle system may determine trust scores for network devices prior to and/or during communication. The system may include vehicle based components and network components.

Another embodiment is directed to a system of devices associated with a particular location, such as a structure, complex, campus, etc. The system may include configuration of devices based on trust scores determined by other devices associated with the location.

Another embodiment is directed to device configurations. The device may be configured to perform one or more security determinations relative to other devices on a network.

Device configurations and methods discussed herein allow for a trust level to be provided for nodes and devices of a network in addition to device issued certificates. In one embodiment, all nodes trust each other only at a certain level and thus, decide the type of interaction to engage in following evaluation of a trust score. As such, all nodes are not trusted equally and only the highly secured devices would be able to maintain high trust scores. Thus, unwanted sensitive information transfer to weak nodes can be avoided. In addition, a certificate based infrastructure can be improved upon to be used in the IOT scenario.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of a system according to one or more embodiments. In one embodiment, system 100 is a network of devices. System 100 includes nodes $105_{1-n}$, communication network 110, certificate authorities $115_{1-n}$, and trust score management servers $120_{1-n}$. System 100 may additionally include data storage, such as optional data storage 125.

System 100 includes a plurality of nodes $105_{1-n}$, wherein each node of system 100 represents a device. In one embodiment, system 100 relates to a network configured to support many different types of devices, such as an IoT network, wherein each device, such as nodes $105_{1-n}$, communicate with each other.

According to one embodiment, nodes $105_{1-n}$ represent devices. According to another embodiment, one or more of nodes $105_{1-n}$ may relate to a collection of devices. As will be used herein, "node' and "device" may be used interchangeably. Nodes $105_{1-n}$ are all configured to communicate via communication network 110 with each other and with one or more elements of the system 100, such as certificate authorities $115_{1-n}$, and trust score management servers $120_{1-n}$. Nodes $105_{1-n}$ may each be individually configured to provide a function or data relative to the system 100. Depending on the type of network, nodes $105_{1-n}$ may each be configured to tailor operation relative to the functions and requirements of the network/system architecture.

According to one embodiment, nodes $105_{1-n}$ in system 100 may each develop a trust-score of each other based on interactions with each other and data shared within system 100. In one embodiment, nodes $105_{1-n}$ may each share trust scores with each other through trust-score management servers, such as trust score management servers $120_{1-n}$. Trust-Score Management Servers (TSMS) are servers that compile trust score from all nodes $105_{1-n}$. According to another embodiment, nodes $105_{1-n}$ collect trust scores of other nodes from multiple sources and estimate their own trust score table. Nodes $105_{1-n}$ can also formulate their own rules for the extent of interaction with other nodes based on the trust factor. Nodes $105_{1-n}$ can also discover other devices based on a common internet networking protocol of communication network 110.

According to one embodiment, nodes $105_{1-n}$ are devices in an IoT network with constraints on resources. The network may be arranged where nodes are not fully trusted until a trust score is determined. The trusts scores of nodes $105_{1-n}$ may be generated in addition to available network certificates (e.g., PKI certificates). According to one embodiment, network certificates (e.g., PKI certificate, etc.) are note modified by trust scores. As such, compatibility with network infrastructure may be maintained. In addition, a trust score of the certificate issuing authority, such as certificate authorities $115_{1-n}$, has to be queried separately from trust score management servers $120_{1-n}$.

In one embodiment, system 100 may relate to a network of nodes $105_{1-n}$ representing vehicles. In another embodiment, system 100 may relate to a network of nodes $105_{1-n}$ representing devices associated with a particular location or structure. In another embodiment, system 100 may relate to a network of nodes $105_{1-n}$ associated with a public space. As such, system 100 and the processes described herein can be deployed for a plurality of uses with one or more configurations tailored to the use.

According to one embodiment, communication network 110 relates to an internet network (e.g., Internet protocol (IP)) and may also include wireless and short range communication between nodes $105_{1-n}$. Communication network 110 may include one or more servers and devices to allow for wired and wireless network communication. According to another embodiment, elements of system 100 and communication network 110 utilize digital certificates (e.g., public key infrastructure (PKI) certificates, etc.) for transfer of information related to communication network 110. According to one embodiment, certificate authorities $115_{1-n}$ relate to one or more network devices or servers configured to provide digital certificates for network nodes and devices, including nodes $105_{1-n}$. Trust scores may be determined and used independent of the type of certificate used by certificate authorities $115_{1-n}$. All certificate formats valid under a public key infrastructure are supported (e.g., DER, PEM, etc.).

According to one embodiment, trust score management servers $120_{1-n}$ relate to network devices or servers configured to collect and distribute trust scores to nodes $105_{1-n}$. System 100 may include one or more trust score management servers $120_{1-n}$ to manage the trust scores of devices represented by nodes $105_{1-n}$. The trust score management servers $120_{1-n}$ can aggregate and manage trust scores provided by other devices in network. According to one embodiment, trust score management servers $120_{1-n}$ are relatively secured servers and can be trusted for authenticity of information. However, devices may assign trust scores to trust score management servers $120_{1-n}$.

Figure 2:
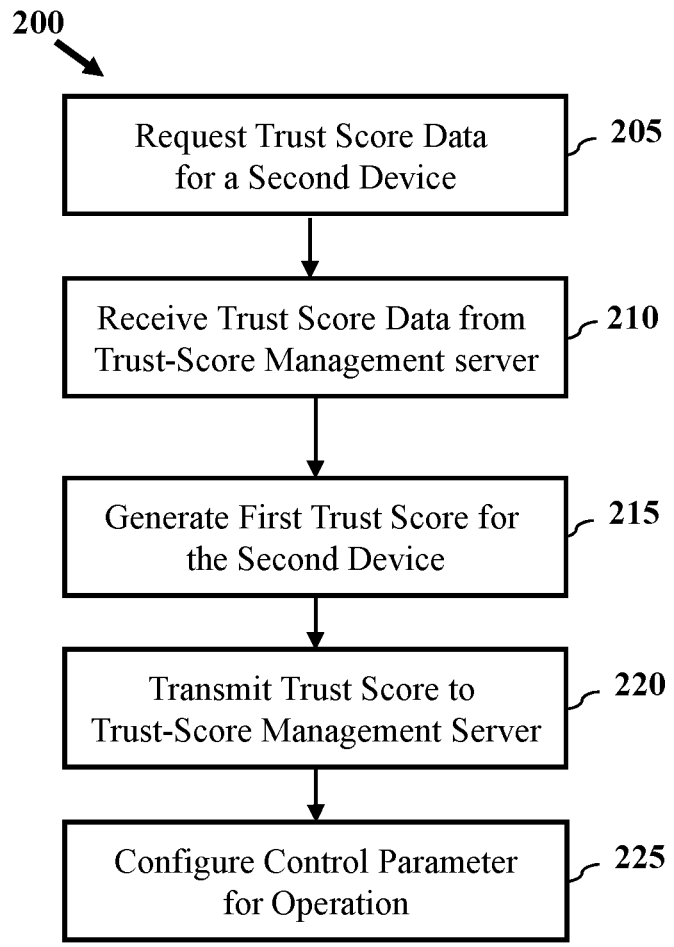
FIG. 2 depicts a process for device security and trust score determination according to one or more embodiments.

FIG. 2 depicts a process for device security and trust score determination according to one or more embodiments. Process 200 may be employed Problem to be solved, how does a device representing a node within the IOT know to trust other devices. Device configuration and process including Scoring is done by devices in peer-to-peer fashion. A device is free to devise its own algorithm to score another device based on their interactions. Hence a device creates a Trust Score Table. It then uploads its trust score table to the Trust Score Management Server. The trust score managements server updates its scores based on the new values received.

Process 200 may be employed by a device, such as a node (e.g., nodes $105_{1-n}$) of a system (e.g., system 100) and one or more other components device security and trust score determination. According to one embodiment, process 200 may be initiated by a first device (e.g., node $105_1$) requesting trust score data for a second device (e.g., node $105_2$) at block 205. The first device requests trust score data from a trust score management server (e.g., trust score management servers $120_{1-n}$). In one embodiment, the request in block 205 is in response to the first device identifying the second device on a network.

At block 210, the first device receives trust score data from the trust score management server. Trust score data received from the trust score management server can providing trust scores for the second device from one or more other devices on the network and trust score data generated by one or more certificate authorities. According to one embodiment, each device may be configured to query trust scores of a node from a trust score management server. In certain embodiments, when no trust score data is available for a node, each device may query other devices for trust scores of the node. In an exemplary embodiment, when a first device wants to interact with a second device and the first device does not have the trust score of second device, the first device needs to query the trust score of the second device from the trust score management server and estimate its own value. The first device can query the trust score of the second device from multiple trust score management serves.

In certain embodiments, the first device and the second device are each configured to provide at least one function and a data storage capability. Accordingly, devices in the network may seek other devices as sources of data for the function of the device. The network may provide a certificate for each device. Trust scores can provide additional security to certificates of devices and a security level associated with the device as a whole and/or related to the functional and data output by each device.

According to one embodiment, each device may have its own process or methodology for determining trust scores. In one embodiment, trust score data received at block 210 includes a rating score for the node provided by the trust score management server. In certain embodiments, trust scores are determined for each communication session between devices.

At block 215, the first device generates a first trust score for the second device. Generating the first trust score can include the first device generating a trust score based on a certificate of the second device and a trust score from a third device. In certain embodiments, generating a trust score may be based on interactions with the second device.

In one embodiment, an interaction between the first device and a second device can include requests for communication and content of the requests. Another interaction can include communications including data. Other interactions can include sharing of resources. During each interaction, each device can review the data provided and characterize authenticity of the data, how the second device operates and whether or not the information provided by the second device matches the devices identification and functions. By way of example, in one embodiment a first device is associated with a module of a vehicle and a second device may relate to a roadside sensor. The first device in this case may evaluate the identification of the second device, and type of data received. In other embodiments, where the second device is a payment terminal the first device may check whether the requested data from the second device matches an expected data set to be provided. When requests by the second device match an expected requirement, the first device may view the interaction positively leading to a higher trust score calculation. For devices associated with a location, when a new device is present on the network a first device associated with the location may notify and/or receive a notification from the second device. Based on the identification information received from the second device and subsequent communications, the first device may determine a trust score. Similarly, a first device entering a public space may assess trust scores for devices located in or associated with the public space.

At block 215, evaluation of trust score of second device based on interaction of first and second device can depend on numerous factors. For a payment gateway, the trust score depends on whether the payment succeeds, how much time the transaction takes, and/or whether some anomalous activity like phishing was detected on the node. For a sensor node, the trust score depends on whether the data received from the sensor follows the expected distribution. In a more general interaction, first device may ask the second device to keep an encrypted block of data. On every subsequent interaction, first device will first query the encrypted block, check its integrity, and then decide the trust score. In this approach, devices are free to implement their own trust score calculation algorithms depending on what type of interactions the nodes are expected to be participant. Such systems may include rule based algorithm or probabilistic intelligent agents which monitor all interactions and output trust scores.

According to one embodiment, trust score determination at block 215 can include determining an average of trust scores available to the first device. At block 215, one of an average of trust score calculations and weighted average of trust scores are performed to determine the first trust score for the second device. For example, the first device may average trust score data it determines with trust score data received from a trust score management server and even trust score data received from another device. In one embodiment, a first device may average data by weighting each category, such that trust scores generated based on directed interactions, trust score data received from a trust score management server, the trust score of the management server and trust scores received from other devices are all weighted. In one embodiment, trust scores generated by the first device based on directed interactions may have the highest influence. By way of example, this trust score may be utilized to account for 50% of the trust score average. In another embodiment, trust score data received from a trust score management server may be afforded a weight based on the information available to the first device. For example, if the first device has no meaningful interaction with a second device, the trust score date of the trust score management server may be afforded at least 50% of the trust score average and in some cases 50-100% of the trust score. In one embodiment, trust scores received from other devices may receive at least 10% of the score average and in some cases range from 5-30% of the trust score average.

In one embodiment, trust scores determined at block 215 are generated by a controller of a device. According to another embodiment, trust score management servers may employ one or more of the trust score determination methods described herein. In an exemplary embodiment, each trust score management server includes a controller or processor configured to determine the trust score.

An example of generating a trust score at block 215 for a first node interested in a second node include based on the trust score data received at block 210 can include trust scores being averages by a controller of the first device. Trust score determination at block 215 can be by the first device without already having a trust score for the second device. According to one embodiment, the first device (e.g., N1) queries the trust score of the second device (e.g., N3) from trust score management servers (e.g., TSMS1 and TSMS2). The first device may also have a certificate of the second device (e.g., N3) is issued by a certificate authority (e.g., CA-2). In this example, the following variables may include:

X1=N1 trusts the certificate from CA-2 with Trust-Score=0.95
X2=Trust Score of N3 from TSMS-1=0.90
X3=Trust Score of N3 from TSMS-2=0.93

The first device's (e.g., N1) estimate of trust-score for the second device (e.g., N3) may be a function of all three variables above, such that:

$$E(N1, N3)=F(X1, X2, X3)$$

wherein $$F(X1, X2, X3, X7, X5)=(X1+X2+X3)/3=(0.95+0.90+0.93)/3=0.93$$

Thus, the first device's (e.g., N1) estimate of trust score of the second device (e.g., N3) is 0.93. A node is free to define its own estimate function. Also, now first device's (e.g., N1) is free to define its rules of interaction with other nodes. By way of example, first device's (e.g., N1) may decide not to share device information below a trust-score of 0.95. In this example, the first device's (e.g., N1) will not share any such sensitive information with second device (e.g., N3).

According to another embodiment, trust scores determined at block 215 can supplement certificates assigned to each device by certificate authorities. For example, even though a device may have a certificate, the trust score can limit or authorize communication.

At block 220, the first device transmits the first trust score for the second device to a trust score management server. Transmitting the first trust score by the first device includes sharing the trust score value and identification of the second device with the server. In one embodiment, certificate authorities can, but are not required to, query trust scores from trust score management servers before issuing a certificate for the device. To maintain the compatibility with the existing PKI infrastructure, certificates are not modified to include any extra information.

According to one embodiment, each trust score management servers (e.g., TSMS1 and TSMS2) will update trusts scores based on trust score data received from the first device. Because each node may use a different method to score other nodes, trust management servers (e.g., TSMS1 and TSMS2) can check the scores based on previously held values. As such, the trust management servers (e.g., TSMS1 and TSMS2) can also source data from each node.

In an exemplary embodiment, a trust management servers (e.g., TSMS1 and TSMS2) determination may be characterized as:

Trust Score of second device (e.g., $N3$)=$(1-\Omega)$*Old Trust Score+$\Omega$*New estimate where $\Omega$ is a hysteresis factor.

In an exemplary embodiment, $\Omega$ is 0.9, such that

Trust Score of $N3$=$0.1*0.95+0.9*((0.92+0.90+0.93)/3)=0.92$

Thus, a new crowd source estimate of second device (e.g., N3) is 0.92. The trust score estimate functions may be modified to include additional trust scores, trust score weighting, and consideration of other parameters.

Generation of trust scores at block 215 and by process 200 provides several features. According to one embodiment, when the authenticity of a node is not completely trusted based on the certificate issued by trusted authority, a device can calculate its own estimate from network sources (e.g., trust score management servers $120_{1-n}$) and interaction with the nodes. In addition, each device can use/define its own rules about the level of interaction with the node of a given trust-score. Moreover, devices can contribute their estimates to the trust score management servers (e.g., trust score management servers $120_{1-n}$). The trust score management servers (e.g., trust score management servers $120_{1-n}$) take trust scores from all available sources and estimate their own scores.

At block 225, the first device configures at least one control parameter for operation of the first device with the second device based on the first trust score. Configuring, by the first device, adjusts a previous control parameter to restrict operation of the first device relative to the second device. In one embodiment, configuring includes determining that the first trust score is below a threshold of the first device for sharing data with other devices. According to another embodiment, the first device maintains a rule based trust score determination for calculation of trust scores. Process 200 may also include the first device setting a data sharing restriction for the second device based on the trust score. The first device can limit interaction with the second device for partial data sharing with the second device based on the trust score calculation.

Figure 3:
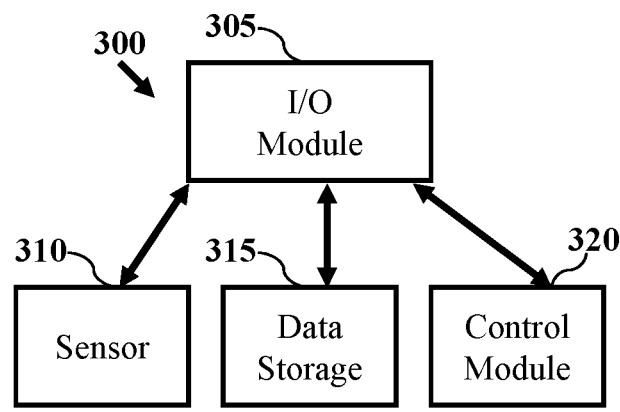
FIG. 3 depicts a graphical representation of device components according to one or more embodiments.

FIG. 3 depicts a graphical representation of device components according to one or more embodiments. According to one embodiment, device 300 relates to a network device or node (e.g., nodes $105_{1-n}$) on a device network (e.g., IoT network). According to one embodiment device 300 may be configured to provide a function and/or data on a network. According to another embodiment, functions and communications of the device 300 may be based on trust scores determined for other devices.

Device 300 includes input/output (I/O) module 305, sensor 310, data storage 315 and control module 320. Sensor 310 may be configured based on the function of the device, and may be configured to sense a condition, state or parameter associated with the device type. For a vehicle, sensor 310 may relate to a vehicle sensor for detecting of vehicle speed, operability, external condition (e.g., distance to target, etc.) or other vehicle application. For a structure, sensor 310 may relate to a function of the device such as a camera, image detection, movement, temperature, operability status, etc. Sensor 310 may be configured to provide output of the sensor to I/O module 305 for transmission and sharing with another device. In certain embodiments, data storage module 315 may store output of sensor 310, and/or control module 320 may direct or control operation of sensor 310. Data storage 315 may be configured to store executable code to operate sensor 310, control module 320 and device 300. In certain embodiments, data storage 315 is configured to store trust score data determined for other devices on a network. Control module 320 is configured to control operation of device 300. According to one embodiment, control module 320 may be configured to limit operation of device 300 with respect to other devices based on a trust score determination. Control module 320 may include executable code for determining trust scores of other devices. By way of example, control module 320 may run process 200 of FIG. 2 to determine a trust score. Control module 320 may execute and direct one or more processes and functional blocks described herein for network security and trust score determinations.

Elements described in device 300 of FIG. 3 may not be a complete list of device elements, as elements may include additional features and/or not all modules depicted. By way of example, a device configuration for a node of the network may include communication capabilities of input/output (I/O) module 305 and a sensor to indicate a particular status or condition.

Device 300 includes is configured to communicate over an IP network protocol. In addition device 300 includes one or more functions. When device 300 is associated with a location such as a residence, device 300 may relate to a cameras, light, home control unit (thermostat, entry (lock), m garage door openings), appliance (refrigerators, coffee maker, etc.) and media (speakers, televisions, media players, etc.), etc. Device 300 may belong to a broad class of devices that are configured for network communication. In the vehicle case, device 300 can relate to modules, components and devices of the vehicle. In many instances, device 300 may be configured to operate with an application or with an application programming interface that allows for multiple types of devices to interoperate.

Figure 4:
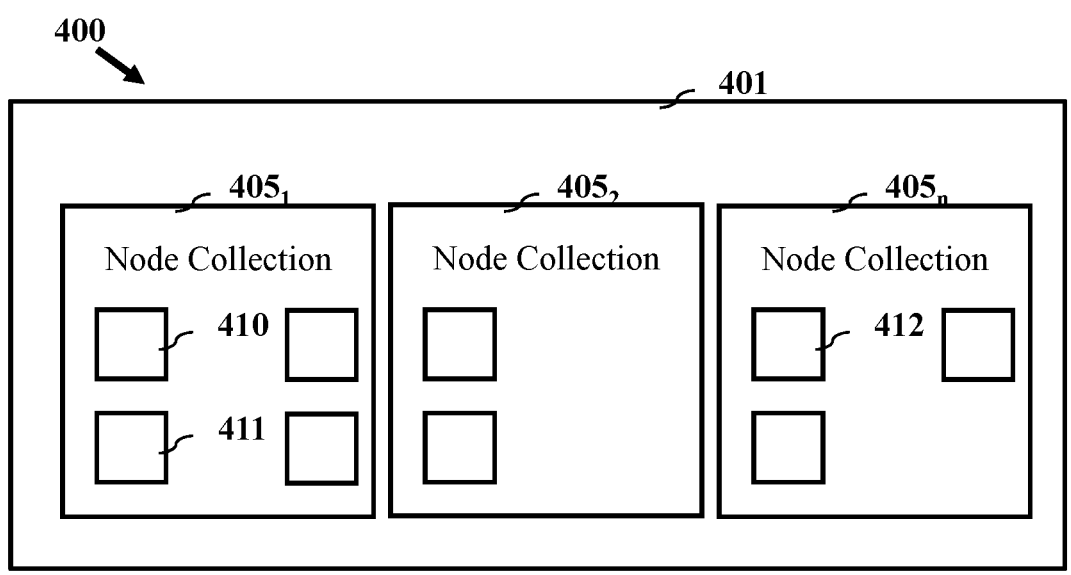
FIG. 4 depicts a graphical representation of devices according to one or more other embodiments.

FIG. 4 depicts a graphical representation of devices according to one or more other embodiments. According to one embodiment, nodes of a network may be associated. By way of example, in one embodiment nodes of a vehicle may be associated with each other. According to another embodiment, nodes of a structure may be associated. Similarly, nodes of a location (e.g., geographic, defined area, etc.) may be associated. According to one embodiment, associated nodes may share trust scores with each other based on trust scores determined for other nodes and/or groupings of nodes. In that fashion, a collection of nodes including nodes with processing capabilities and nodes with simple functionality can allow for nodes with the processing ability to provide security for the nodes without the processing capability.

FIG. 4 depicts system 400 including node collections $405_{1-n}$ within a grouping 401. According to one embodiment, node collections $405_{1-n}$ each relate to an association of nodes. By way of example, node collection $405_1$ may relate to a particular vehicle including a plurality of network devices, such as 410 and 411. According to another embodiment, node collection $405_1$ may relate to a collection of different devices, where node 410 is a vehicle and node 411 is a sensor unrelated to the vehicle. Node collections $405_{1-n}$ may represent particular structures. In one embodiment, grouping 401 may relate to node collections of one or more users.

In accordance with the description here, in one embodiment, a node, such as node 410 may determine trust scores for one or more other nodes such as node 411 and node 412. According to one embodiment, node 410 may determine a trust score for node 411 based on interaction with the node and/or trust score data received by node 410. Similarly, node 410 may determine a trust score for node 412 based on interaction with the node and/or trust score data received by node 410. In certain embodiments, node 410 may share trust scores with other nodes of a node collection. For example, node 410 may share trust scores determined for node 412 with all nodes of node grouping $405_1$ including node 411. Shared trust score data may be utilized by a particular node within the node grouping to either accept the trust score or for incorporation with the trust score calculation.

Figure 5:
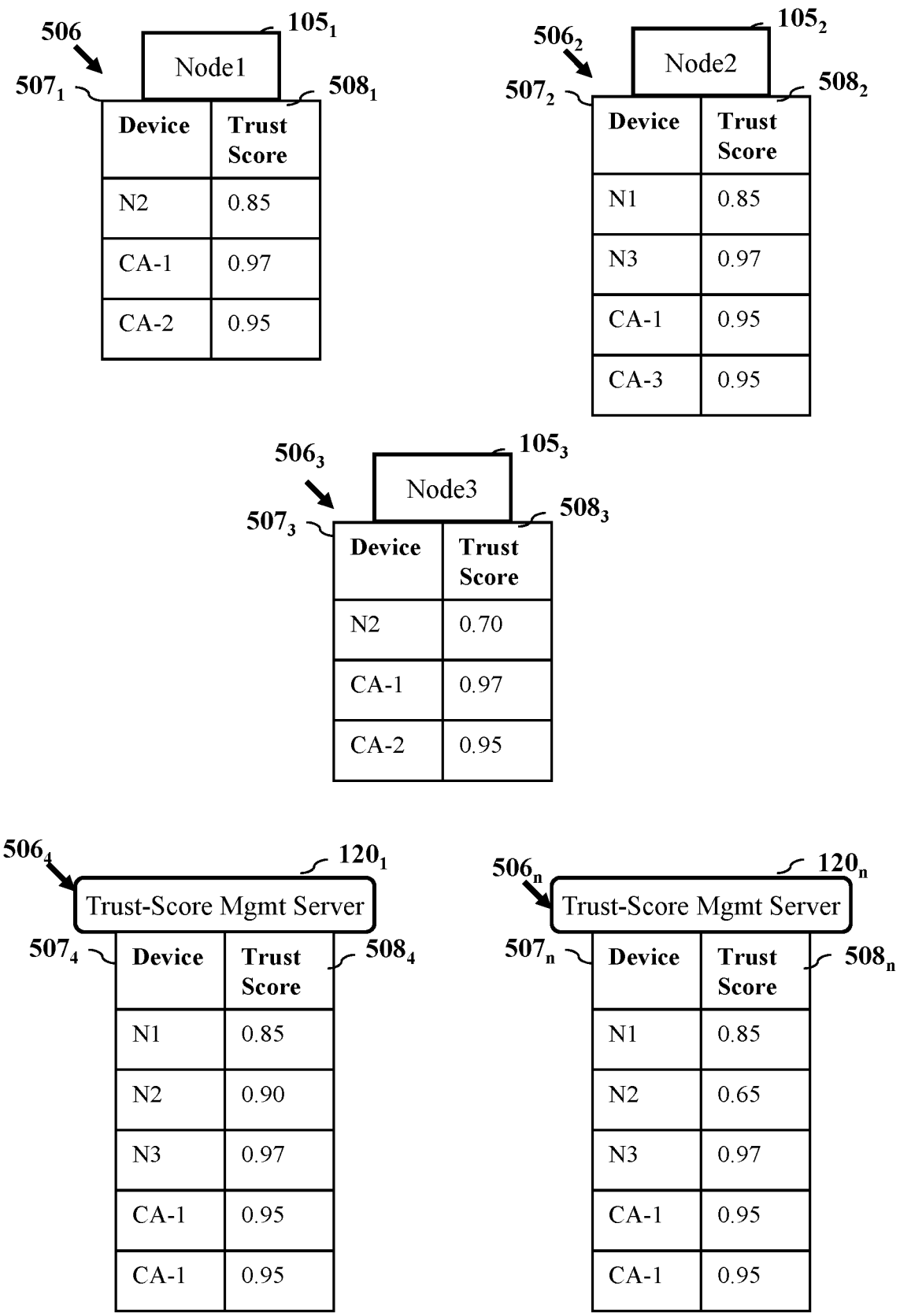
FIG. 5 depicts graphical representation of trust-score data according to one or more embodiments.

FIG. 5 depicts graphical representation of trust-score data according to one or more embodiments. According to one embodiment, each node/device (e.g., nodes $105_{1-n}$) in a network may evaluate, calculate and share trust scores in the network. FIG. 5 depicts trust score tables representing trust score data for elements of a network with respect to system 100 of FIG. 1. According to one embodiment, data storage (e.g., data storage 315) modules of each node may store identifications of other nodes and a trust score determination for each node.

According to one embodiment, nodes $105_{1-n}$ and trust score management servers $120_{1-n}$ can store may include a data storage represented as tables $506_{1-n}$ in FIG. 5. Tables in FIG. 5 include identification $507_{1-n}$ of devices and certificate authorities, and trust scores $508_{1-n}$ for each.

According to one embodiment, each device may have a predetermined setting or time period for storing trust scores. For devices that are frequently communicated with, each deice may extend the time period for storing a trust score. Trust score management servers may store trust scores without a termination period.

Figure 6:
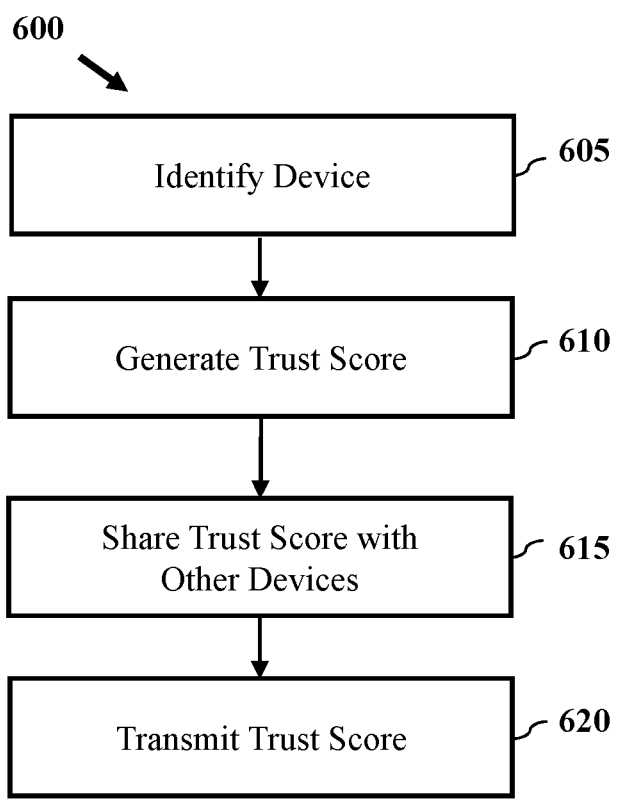
FIG. 6 depicts a process for device operation including sharing trust score data according to one or more embodiments.

FIG. 6 depicts a process for network device operation including generating and sharing trust score data according to one or more embodiments. Process 600 may be initiated at block 605 when a device and/or trust score management server identifies a second device on the network. Devices may be identified by access to the network and registration with at least one network device. In certain embodiments, servers of the network may list available devices. Devices and trust score management servers may request and/or receive listings of devices on the network.

At block 610, the device generates a trust score for the second device. Trusts scores may be generated as described above and may account for peer-to-peer interactions with devices.

At block 615, the device shares the trust score with other devices. According to one embodiment, associated devices (e.g., node collection $405_1$) may include one or more devices configured to determine a trust score and share the determined trust score among the group of devices. In this fashion, certain associated devices can rely on the control of a particular device to determine trust scores for other devices. In a vehicle, a main controller of one network device of the vehicle may determine trust scores to be shared with other devices of the vehicle at block 615. Similarly, a device associated with a location, can share trust scores with other devices associated with the location.

At block 620, the device transmits the trust score to a trust management server. The trust management server can send trust score data to other devices. In certain embodiments, certificate authorities may query trust score management servers for trust score data of any device on the network. The certificate authority may choose to incorporate trust score data to decide whether or not to issue certificates to devices. The trust score management servers and certificate authorities are not bound to be synchronized with each other.

Figure 7:
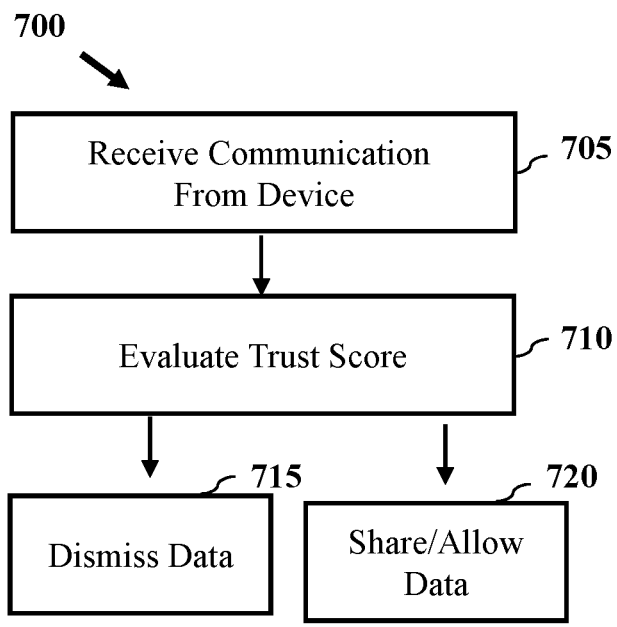
FIG. 7 depicts a process for operation of a device according to one or more embodiments.

FIG. 7 depicts a process for operation of a device according to one or more embodiments. According to one embodiment, process 700 may by employed by a device during operation on a network. Process 700 may be initiated at block 705 with a first device receiving a communication from a second device. According to one embodiment, the device may evaluate a trust score of the device at block 710 before acting on the communication. Trust evaluation at block 710 may include generating a trust score for the second device. The device can dismiss the communication and data received at block 715 when the trust score is below a predefined threshold or share and/or allow data with the second device at block 720.

According to one embodiment, when a device receives a communication at block 705 related to payment or transmission of sensitive information, the device may also check other parameters in addition to evaluation of the trust score. For a vehicle which includes a mobile payment node/device that receives a toll collection, for example, the device may evaluate the trust score of the toll collection device and whether or not multiple toll requests are received. Similarly, for access to a network such as public internet (e.g., public WiFi), the device may evaluate the credentials of the public internet server prior to connection and sharing of data.

At block 710, the first device may also detect if a device is behaving maliciously. In one embodiment, the device may employ a rule based approach, such that any node below a specific trust score (e.g. 0.50) would be dismissed at block 715. Devices in the network may share a set of rules for the calculation of trust scores. According to another embodiment, devices may employ a behavior based approach to detect anomalies with operation of a device. For example, image sensor nodes not transmitting image data. Nodes can also define their own rules about to determine which types of devices to interact with on the network.

While this disclosure has been particularly shown and described with references to exemplary embodiments thereof, it will be understood by those skilled in the art that various changes in form and details may be made therein without departing from the scope of the claimed embodiments.

What is claimed is:

1. A method for device security and trust score determination, the method comprising:
   requesting, by a first device, a certificate of a second device, wherein the first device requests the certificate from a certificate authority;
   receiving, by the first device, the certificate from the certificate authority;
   requesting, by the first device, trust score data for the second device, wherein the first device requests trust score data from a trust score management server;
   receiving, by the first device, trust score data from the trust score management server;
   generating, by the first device, a first trust score for the second device;
   transmitting, by the first device, the first trust score for the second device to a trust score management server;
   configuring, by the first device, at least one control parameter for operation of the first device with the second device, the at least one control parameter being based on both the certificate from the certificate authority and the first trust score for the second device generated by the first device, wherein configuring adjusts a previous control parameter to restrict operation of the first device relative to the second device; and
   dismissing communication and data received by the first device from the second device when the first trust score for the second device is below a threshold,
   wherein the first trust score for the second device is generated based on one or more interactions between the first device and the second device, including at least one of: a request for communication; a content of a request for communication; a communication; a data of a communication; and a resource sharing.

2. The method of claim 1, wherein requesting is in response to the first device identifying the second device on a network.

3. The method of claim 1, wherein the first device and the second device are each configured to provide at least one function and a data storage capability.

4. The method of claim 1, wherein generating the first trust score includes the first device generating a trust score based on the certificate of the second device, and a trust score from a third device.

5. The method of claim 1, wherein transmitting the first trust score by the first device includes sharing the trust score value and identification of the second device with the server.

6. The method of claim 1, wherein configuring includes determining that the first trust score is below a threshold of the first device for sharing data with other devices.

7. The method of claim 1, further comprising setting, by the first device, a data sharing restriction for the second device based on the trust score.

8. The method of claim 1, wherein one of an average of trust score calculations and weighted average of trust scores are performed to determine the first trust score for the second device.

9. The method of claim 1, wherein the first device maintains a rule based trust score determination for calculation of trust scores.

10. The method of claim 1, wherein the first device limits interaction with the second device for partial data sharing with the second device based on the trust score calculation.

11. The method of claim 1, wherein the configuration of the at least one control parameter based on the certificate and the first trust score is different than an alternate configuration of the at least one control parameter based on the certificate.

12. A device configured with security and trust score determination on a network, the device comprising:
   a hardware processor; and
   a storage including executable code which, when executed, cause the processor to:
   request trust score data for a second device, wherein the first device requests trust score data from a trust score management server;
   receive trust score data from the trust score management server;
   generate a first trust score for the second device;
   transmit the first trust score for the second device to a trust score management server;
   configure at least one control parameter for operation of the first device with the second device based at least in part on the first trust score for the second device and independent of any certificate of the second device that is received from a certificate authority and is determined independent of the first trust score for the second device, wherein configuring adjusts a previous control parameter to restrict operation of the first device relative to the second device; and
   dismiss communication and data received by the first device from the second device when the first trust score for the second device is below a threshold,
   wherein the first device makes rule based trust score calculations in accordance with an algorithm of the first device for calculating trust scores of other devices based on their interactions.

13. The device of claim 12, wherein requesting is in response to the first device identifying the second device on a network.

14. The device of claim 12, wherein the first device and the second device are each configured to provide at least one function and a data storage capability.

15. The device of claim 12, wherein generating the first trust score includes the first device generating a trust score based on the certificate of the second device, and a trust score from a third device.

16. The device of claim 12, wherein transmitting the first trust score by the first device includes sharing the trust score value and identification of the second device with the server.

17. The device of claim 12, wherein configuring includes determining that the first trust score is below a threshold of the first device for sharing data with other devices.

18. The device of claim 12, further comprising setting, by the first device, a data sharing restriction for the second device based on the trust score.

19. The device of claim 12, wherein one of an average of trust score calculations and weighted average of trust scores are performed to determine the first trust score for the second device.

20. The device of claim 12, wherein the first device maintains a rule based trust score determination for calculation of trust scores.

21. The device of claim 12, wherein the first device limits interaction with the second device for partial data sharing with the second device based on the trust score calculation.

* * * * *